United States Patent
Junghans et al.

(10) Patent No.: US 12,158,848 B2
(45) Date of Patent: Dec. 3, 2024

(54) COMBINING PERIPHERAL COMPONENT INTERFACE EXPRESS PARTIAL STORE COMMANDS ALONG CACHE LINE BOUNDARIES

(71) Applicant: INTERNATIONAL BUSINESS MACHINES CORPORATION, Armonk, NY (US)

(72) Inventors: Sascha Junghans, Ammerbuch (DE); Matthias Klein, Poughkeepsie, NY (US); Julian Heyne, Stuttgart (DE); Norbert Hagspiel, Tuebingen (DE); Fahmiyah Samad, Stuttgart (DE); Ananth Garikapati, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 17/961,598

(22) Filed: Oct. 7, 2022

(65) Prior Publication Data

US 2024/0119013 A1 Apr. 11, 2024

(51) Int. Cl.
G06F 13/16 (2006.01)
G06F 13/40 (2006.01)
G06F 13/42 (2006.01)

(52) U.S. Cl.
CPC ...... G06F 13/1668 (2013.01); G06F 13/4027 (2013.01); G06F 13/4221 (2013.01); G06F 2213/0026 (2013.01)

(58) Field of Classification Search
CPC ............ G06F 13/1668; G06F 13/4027; G06F 13/4221; G06F 2213/0026
See application file for complete search history.

(56) References Cited

U.S. PATENT DOCUMENTS

| | | |
|---|---|---|
| 7,130,958 B2 | 10/2006 | Chou et al. |
| 10,042,554 B2 | 8/2018 | Ambroladze et al. |
| 10,223,308 B2 | 3/2019 | Craddock et al. |
| 10,223,315 B2 | 3/2019 | Breakstone et al. |
| 10,394,747 B1 | 8/2019 | Paneah et al. |
| 10,423,546 B2 | 9/2019 | Jagspiel et al. |
| 10,528,253 B2 | 1/2020 | Ambroladze et al. |
| 10,529,396 B2 | 1/2020 | Ambroladze et al. |
| 10,599,549 B2 | 3/2020 | Zhang et al. |
| 10,909,012 B2 | 2/2021 | Yang |
| 11,169,938 B2 | 11/2021 | Gissin et al. |

(Continued)

OTHER PUBLICATIONS

Alian et al., Simulating PCT-Express Interconnect for Future System Exploration, 2018 IEEE International Symposium on Workload Characterization (IISWC), DOI: 10.1109/IISWC.2018.8573496, Date Added to IEEE Xplore: Dec. 13, 2018, 11 pages.

(Continued)

*Primary Examiner* — Nimesh G Patel (57) ABSTRACT

Combining PCIe partial store commands along cache line boundaries, including: receiving a plurality of Peripheral Component Interface express (PCIe) packets; splitting the plurality of PCIe packets along cache line boundaries to generate a plurality of partial store commands; and combining one or more sets of partial store commands to generate one or more combined partial store commands aligned to the cache line boundaries.

20 Claims, 11 Drawing Sheets

(56) References Cited

U.S. PATENT DOCUMENTS

| | | | |
|---|---|---|---|
| 11,216,396 B2 | | 1/2022 | Schmisseur et al. |
| 2005/0235067 A1* | | 10/2005 | Creta .................. G06F 13/4027 |
| | | | 710/5 |
| 2006/0095609 A1* | | 5/2006 | Radhakrishnan ... G06F 13/1631 |
| | | | 710/52 |
| 2008/0235461 A1* | | 9/2008 | Tan .................... G06F 13/1668 |
| | | | 711/146 |
| 2008/0235484 A1* | | 9/2008 | Tal ......................... G06F 13/28 |
| | | | 711/201 |
| 2009/0031058 A1* | | 1/2009 | Radhakrishnan ... G06F 13/1631 |
| | | | 710/53 |
| 2014/0101400 A1 | | 4/2014 | Craddock et al. |
| 2018/0165201 A1* | | 6/2018 | Hashemi ............. G06F 12/0886 |
| 2019/0087352 A1 | | 3/2019 | Lee et al. |
| 2021/0271537 A1 | | 9/2021 | Gong et al. |
| 2021/0406195 A1 | | 12/2021 | Vakharwala et al. |

OTHER PUBLICATIONS

Kurt Lender, Compute Express Link (CXL): A Coherent Interface for Ultra-High-Speed Transfers, Flash Memory Summit, URL: https://www.flashmemorysummit.com/Proceedings2019/08-07-Wednesday/20190807_CTRL-202A-1_Lender.pdf, CXL Marketing Work Group, Ecosystem Enabling Manager, Intel Corporation, Flash Memory Summit 2019, Santa Clara, CA, dated Aug. 2019, 22 pages.

Li et al., KV-Direct: High Performance In-Memory Key-Value Store with Programmable NIC, SPS{ '17: Proceedings of the 26th Symposium on Operating Systems Principles, URL: https://doi.org/10.1145/3132747.3132756, dated Oct. 2017, 16 pages.

Molka et al., Cache Coherence Protocol and Memory Performance of the Intel Haswell-EP Architecture, Proceedings of the 44th International Conference on Parallel Processing (ICPP' 15), DOI: 10.1109/ICPP.2015.83, Date Added to IEEE Xplore: Dec. 10, 2015, 10 pages.

Zambre et al., Breaking Band: A Breakdown of High-performance Communication, ICPP 2019: Proceedings of the 48th International Conference on Parallel Processing, Article No. 47, URL: https://doi.org/10.1145/3337821.3337910, dated Aug. 2019, dated Aug. 2019, 10 pages.

* cited by examiner

FIG. 1

PRIOR ART

COMBINING PERIPHERAL COMPONENT INTERFACE EXPRESS PARTIAL STORE COMMANDS ALONG CACHE LINE BOUNDARIES

BACKGROUND

Field of the Invention

The field of the invention is data processing, or, more specifically, methods, apparatus, and products for combining Peripheral Component Interface express (PCIe) partial store commands along cache line boundaries.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Peripheral Component Interface express (PCIe) devices, such as network interface devices, may provide data as a stream of packets for storage as a direct memory access (DMA) operation. Certain architectures require that these data transfers be aligned to cache line boundaries. Accordingly, where the packets are not aligned to a cache line boundary, the packet must be broken into separate storage operations that are aligned to the cache line boundaries. Where consecutive partial store commands are directed to the same cache line, this may result in reduced performance.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

SUMMARY

Combining Peripheral Component Interface (PCIe) partial store commands along cache line boundaries, including: receiving a plurality of PCIe packets; splitting the plurality of PCIe packets along cache line boundaries to generate a plurality of partial store commands; and combining one or more sets of partial store commands to generate one or more combined partial store commands aligned to the cache line boundaries.

DETAILED DESCRIPTION

Figure 1:
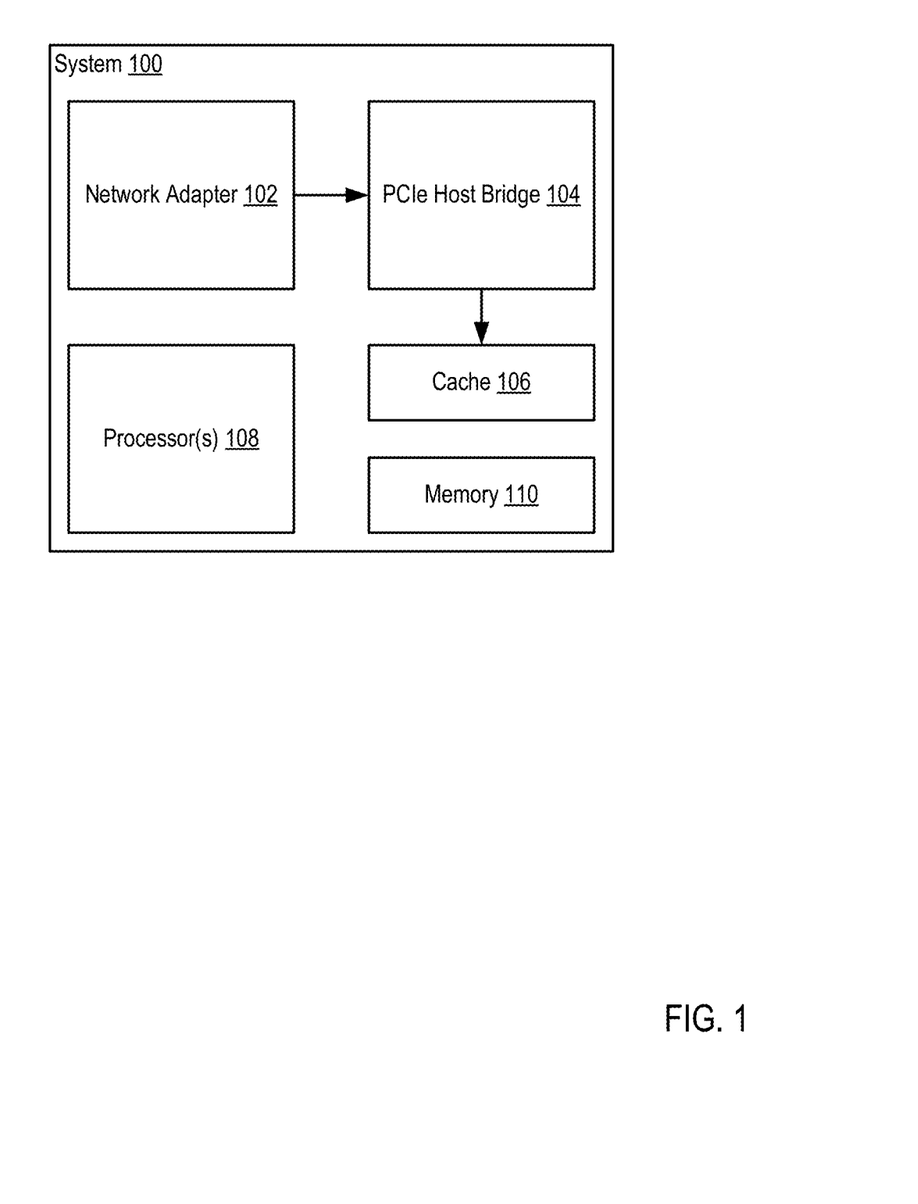
FIG. 1 shows a flowchart of an example system for combining PCIe partial store commands along cache line boundaries according to some embodiments of the present disclosure.

FIG. 1 shows an example system 100 for combining PCIe partial store commands along cache line boundaries according to some embodiments of the present disclosure. The example system 100 may be implemented, for example, using one or more computing devices, as a component of a data center, mainframe, cloud computing environment, and the like. The system 100 includes a network adapter 102. The network adapter 102 is a peripheral network adapter 102 such as an Ethernet card coupled to the system 100 via a PCIe interface. Accordingly, in some embodiments, the network adapter 102 may accept frames or packets of input data such as Ethernet frames and provide the payload of incoming frames as PCIe packets to a PCIe Host Bridge (PHB) 104.

The PHB 104 serves as an intermediary or interlock between the network adapter 102, as well as potentially other PCIe devices, and the cache 106 and processors 108. Accordingly, the PHB 104 may store data received from the network adapter 102 using direct memory access (DMA) operations into the cache 106. As will be described in further detail below, the PHB 104 may be configured to perform operations relating to combining PCIe partial store commands along cache line boundaries according to some embodiments of the present disclosure. The system 100 also includes memory 110, which may include volatile memory or non-volatile memory, including Random Access Memory (RAM), disk storage, and the like.

Figure 2:
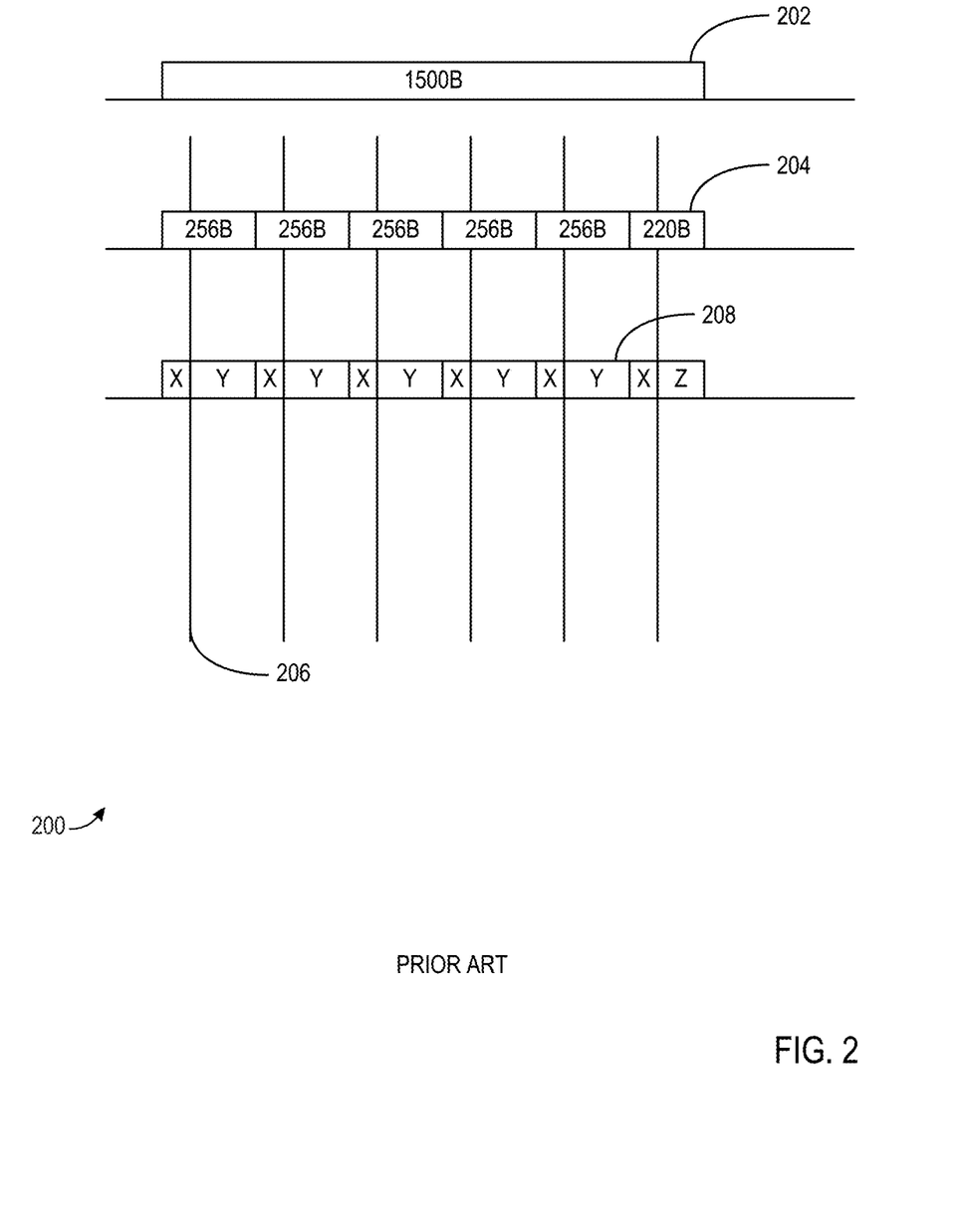
FIG. 2 shows a diagram for breaking PCIe packets into partial store commands according to embodiments known in the art.

Turning to FIG. 2, FIG. 2 presents a diagram 200 for breaking PCIe packets into partial store commands according to embodiments known in the art. One skilled in the art will appreciate that the data sizes shown in the example diagram 200 as well as the subsequent figures are merely exemplary and that the approaches set forth herein are also applicable to other sizes of data payloads, cache lines, PCIe packets, and the like. The diagram 200 shows an Ethernet frame 202 including a 1500 byte payload. The Ethernet frame 202 may correspond to a packet received via a PCIe network adapter 102.

In order to provide the data payload of the Ethernet frame 202 via a PCIe bus to the PHB 104, the network adapter 102 breaks the payload of the Ethernet frame 202 into multiple PCIe packet payloads shown as PCIe packets 204. Here, for a 1500 byte payload, five PCIe packets 204 of 256 bytes and one PCIe packet 204 of 220 bytes is generated. The example diagram 200 assumes a cache line size of 256 bytes, with the boundaries of these cache lines shown as cache line boundaries 206. Here, the stream of PCIe packets 204 are not aligned along cache line boundaries in that a storage operation of their payloads would not cross a cache line boundary 206.

Accordingly, the PHB 106 generates partial store commands 208 for storing data aligned to the cache line boundaries 206. A partial store command 208 is a storage operation, such as a DMA storage operation, that stores a subset of data in a PCIe packet 204 payload. Here, the partial store commands 208 are of sizes X, Y, or Z bytes, where X+Y=256 for a 256 byte cache line. One skilled in the art will appreciate that the use of a 256 byte cache line is merely exemplary, and that other sizes of cache lines are also contemplated within the scope of the present disclosure. Under the PCIe standard, the data of the PCIe packets 204 should be written or otherwise made available to processors 108 in the order in which they were received. As shown, a given cache line is written to by two concurrent partial store commands 208 of sizes Y and X, respectively. Under some architectures, concurrent partial store commands 208 directed to a same cache line may result in degraded performance.

Figure 3:
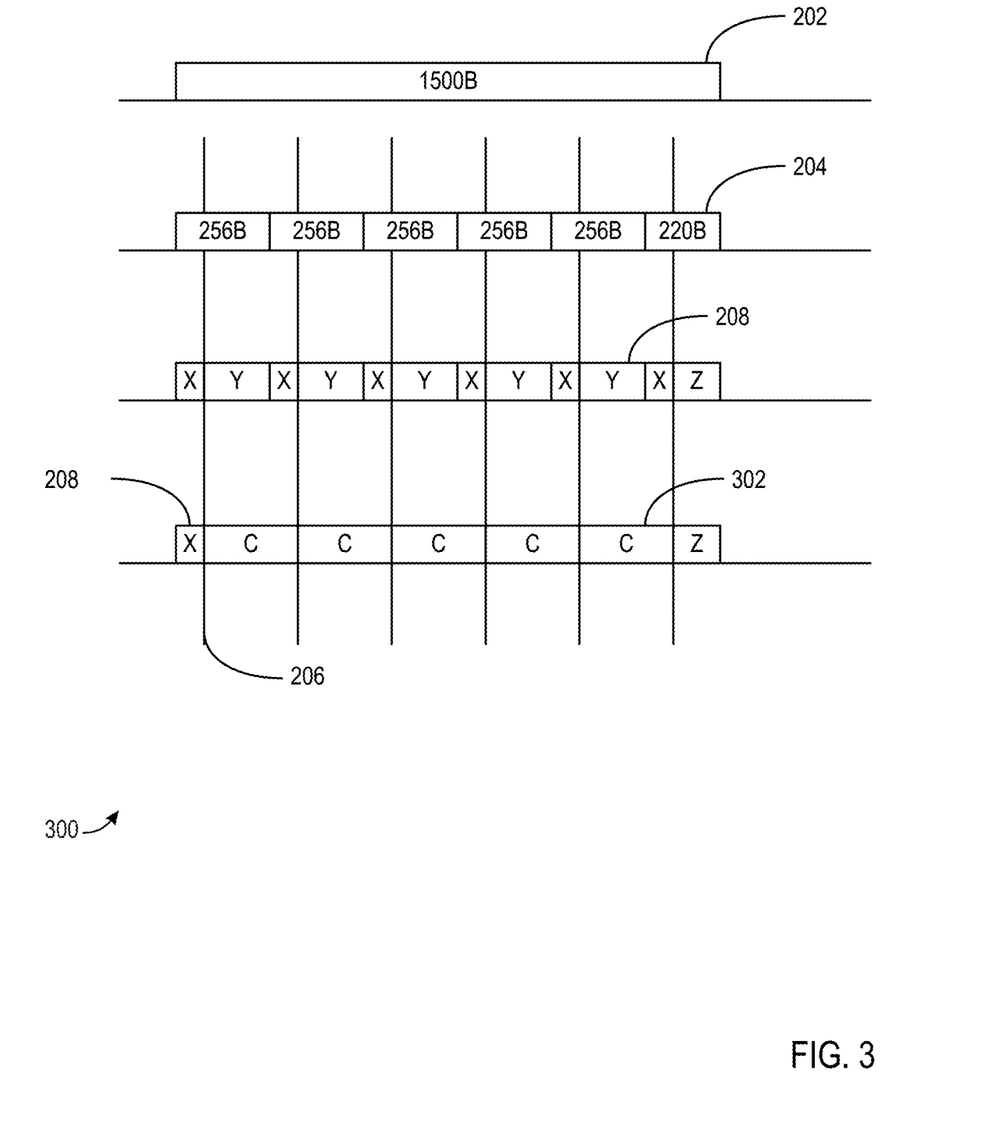
FIG. 3 shows a diagram for combining PCIe partial store commands along cache line boundaries according to some embodiments of the present disclosure.

To address these concerns, FIG. 3 shows an example diagram for combining PCIe partial store commands along cache line boundaries according to some embodiments of the present disclosure. Here, after generating the partial store commands 208, the PHB 106 generates combined partial store commands 302 aligned along cache line boundaries 208. A combined partial store command 302 is a single storage operation that stores the data payloads of two or more partial store commands 208. Although the following discussion presents examples with respect to combining two partial store commands 208, it is understood that a set of partial store commands 208 including more than two partial store commands 208 may also be combined in to a combined partial store command 302. In some embodiments the resulting combined partial store command 302 may itself be a partial store command 208 in that it is not a full store command but is nonetheless aligned to cache line boundaries. As shown, each combined partial store command 302 stores the data from a partial store command 208 of Y bytes and a partial store command 208 of X bytes, resulting in a total storage size of 256 bytes assuming 256 byte cache lines. The partial store commands 208 used to generate a given combined partial store command 302 are those partial store commands 208 that would otherwise be written to a same cache line. Accordingly, as the partial store commands 208 that would otherwise be written to a same cache line would include data from different PCIe packets 204, the combined partial store commands 302 will cause data to be stored from these different PCIe packets 204.

Executing a partial store command 208 or combined partial store command 302 causes the data of the partial store command 208 or combined partial store command 302 to be written to cache 108 (e.g., via a DMA operation). The stored data is thus available to processors 106 unless coherency protection is applied to a given cache line, as will be described in further detail below. As shown, generating the combined partial store commands 302 may still require one or more partial store commands 208 to completely store all data (e.g., an initial partial store command 208 of X bytes and a final partial store command 208 of Z bytes. The number and size of required partial store commands 208 will vary depending on the amount of data to be stored in the initial PCIe packets 204 as well as the particular alignment of the totality of data to be stored.

Figure 4:
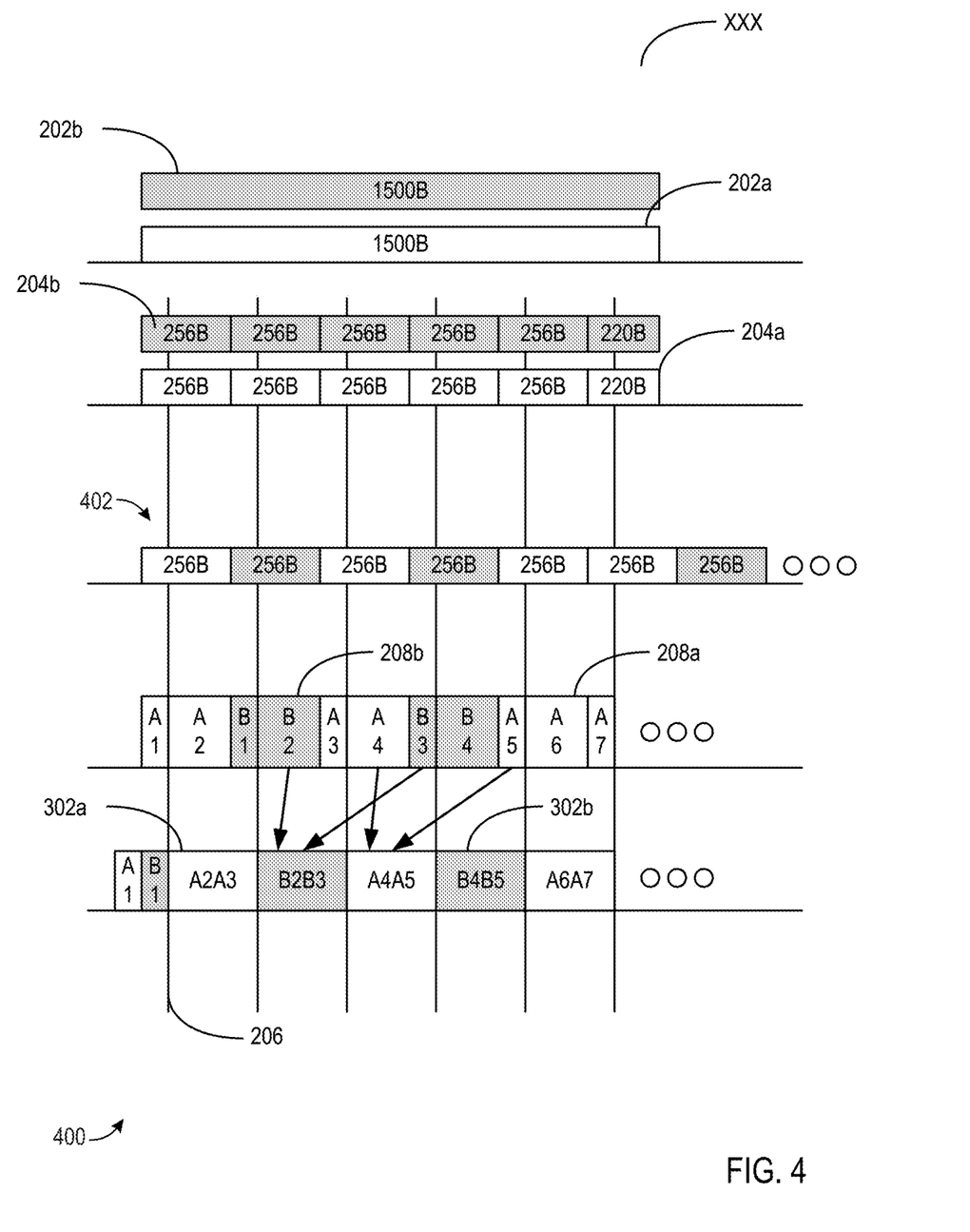
FIG. 4 shows a diagram for combining PCIe partial store commands along cache line boundaries using multiple input streams according to some embodiments of the present disclosure.

FIG. 4 sets forth another diagram 400 for combining PCIe partial store commands along cache line boundaries where a network adapter 102 provides data from multiple Ethernet frames 202 as an interleaved stream of PCIe packets 204. Here, the diagram 400 shows a network adapter 102 receiving an Ethernet frame 202a and Ethernet frame 202b. The network adapter 102 generates, from the payloads of Ethernet frames 202a,b, PCIe packets 204a and 204b, respectively. Although the following discussion describes two Ethernet frames 202a,b resulting two streams of PCIe packets 204a,b being interleaved into a same stream, one skilled in the art will appreciate that the approaches set forth herein may be applicable to any number of Ethernet frames 202 and corresponding streams of PCIe packets 204.

The PCIe packets 204a,b are provided to the PHB 104 as an interleaved stream 402 of PCIe packets 204a,b. The PHB 104 then generates partial store commands 208a,b from the received PCIe packets 204a,b, respectively. The partial store commands 208a,b are shown with labels indicating their respective source grouping of PCIe packets 204a,b (e.g., either "A" or "B") and a number indicating its sequence relative to other partial store commands 208a,b from its source grouping. For example, partial store command 208a A1 is the first partial store command 208a generated from PCIe packets 204a. As another example, partial store command 208b B3 is the third partial store command 208b generated from PCIe packets 204b.

The PHB 104 then generates combined partial store commands 302a,b from corresponding partial store commands 208a,b. That is, combined partial store commands 302a are generated from partial store commands 208a while combined partial store commands 302b are generated from partial store commands 208b. For example, combined partial store command 302a A2A3 is generated from partial store commands 208a A2 and A3. As another example, combined partial store command 302a B4B5 is generated from partial store commands 208b B4 and B5.

Under the PCIe standard, data should be made available to processors 108 according to the order in which it was received. As shown, where multiple streams of data are received as an interleaved stream of PCIe packets 204a,b, there is a possibility that the resulting combined partial store commands 302a,b may be ordered such that data from some partial store command 208a,b may be in a combined partial store command 302a,b before a sequentially earlier partial store command 208a,b. As an example, partial store command 208b B3 is combined into combined partial store command 302b B2B3. However, combined partial store command 302a A4A5 occurs after the combined partial store command 302*b* B2B3 but includes data from partial store command 208*a* A4, which before partial store command 208*b* B3, as shown by the overlapping arrows. Were combined partial store command 302*b* B2B3 performed and committed before combined partial store command 302*a* A4A5, this would result in an ordering violation.

Accordingly, in some embodiments, where two or more combined partial store commands 302*a,b* have overlapping partial store commands 208*a,b* (e.g., where a sequentially later combined partial store command 302*a,b* is based on a partial store command 208*a,b* occurring sequentially between the partial store commands 208*a,b* of a sequentially earlier combined partial store command 302*a,b*), the PHB 104 may apply coherency protection to the cache lines corresponding to the combined partial store commands 302*a,b*. Where coherency protection to a given cache line is applied, a processor 108 is unable to access the given cache line. Thus, a processor 108 may not access any data stored out of order until coherency protection is released. As the data stored out of order is not made available to the processor 108, ordering restrictions under the PCIe standard are not violated. For example, the processor 108 can observe an older value for both partial store commands 302*a,b*, a new value for partial store command 302*a* and either an old or new value for partial store command 302*b*, but never an old value for partial store command 302*a* and a new value for partial store command 302*b*.

Figure 5:
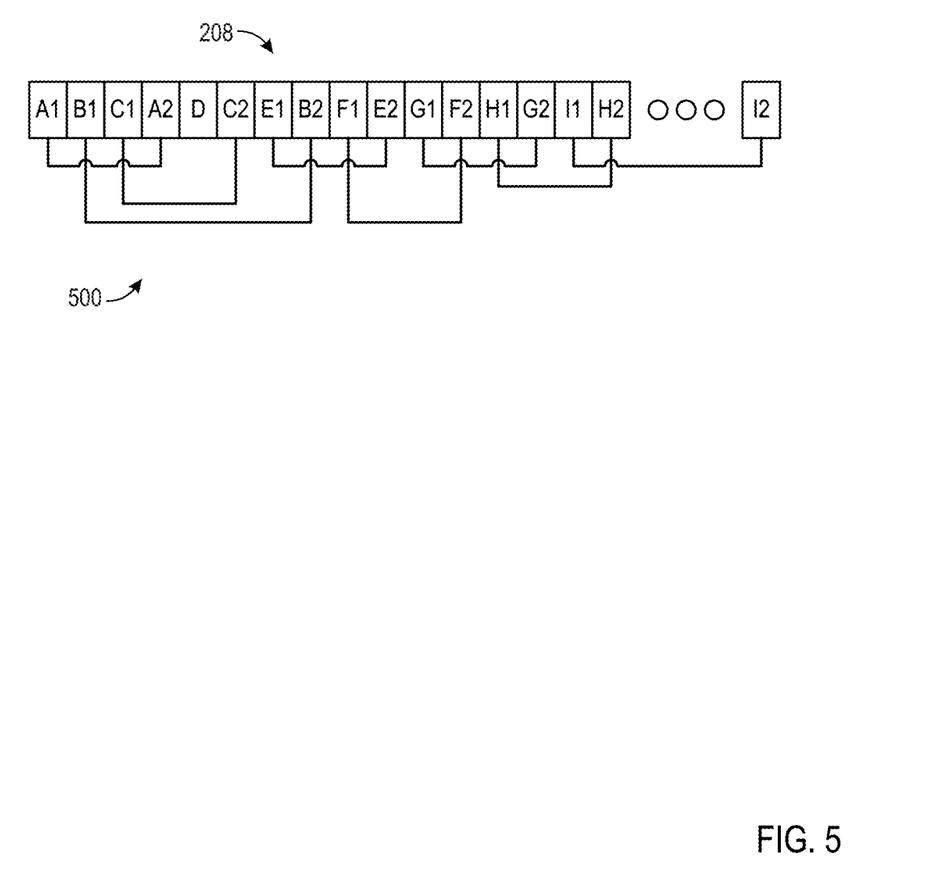
FIG. 5 shows a diagram of overlapping combined partial store commands according to some embodiments of the present disclosure.

After successful completion of the combined partial store commands 302*a,b* with overlapping partial store commands 208*a,b*, coherency protection for these cache lines may then be released. Should an error occur in performing a given combined partial store command 302*a.b* with coherency protection applied, the combined partial store commands 302*a,b* with overlapping partial store commands 208*a,b* should be split and instead executed as partial store commands 208*a*.

Where many streams of PCIe packets 204 are interleaved into an interleaved stream, there is a possibility that there may be many nested or overlapping pairs of partial store commands 208. Accordingly, FIG. 5 shows another example diagram 500 of overlapping partial store command 208 pairs, referred to hereinafter as "head" or "tail" commands, according to some embodiments. Here, head commands B1 and C1 are surrounded by pair A1 and A2. Tail A2 is surrounded by pair C1 and C2. Pair C1 and C2 is surrounded by pair B1 and B2. Of particular note, head G1 is surrounded by pair F1 and F2, tail F2 is surrounded by pair G1 and G2, head H1 is surrounded by pair G1 and G2, and so forth. In other words, depending on the exact structure of the input data, a potentially infinite chain of overlapping pairs of PCIe packets 204 is possible.

Figure 6A:
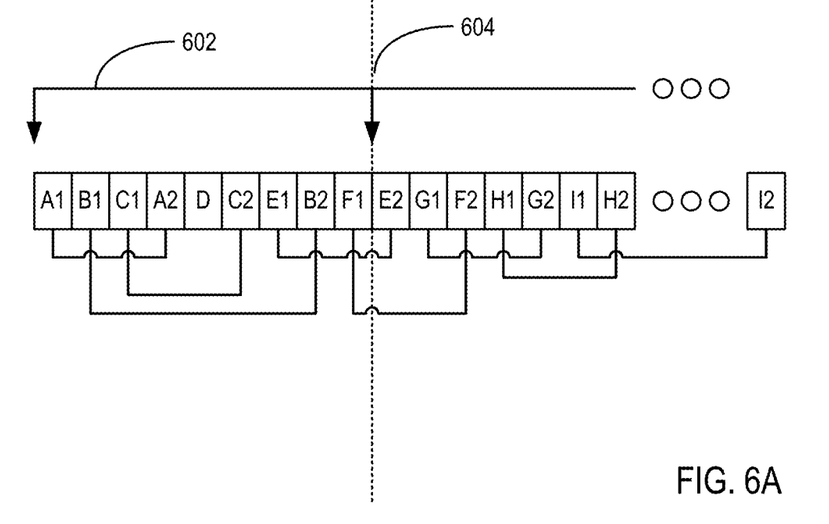
FIG. 6A an example approach for windowed mergers of overlapping combined storage operations according to some embodiments of the present disclosure.

To address these concerns, various approaches may be used to prevent infinitely overlapping chains of partial store commands 208. For example, as shown in FIG. 6A, a repeating window 602 may limit the partial store commands 208 that may be merged into combined partial store commands 302. Here, no pairs of partial store commands 208 that cross a break 604 between windows may be performed. As shown in the example of FIG. 6A, the break 604 occurs between F1 and E2. Thus, within the window 602, pairs A1 and A2, B2 and B2, and C1 and C2 may be combined into combined partial store commands 302. Pairs E1 and E2 and F1 and F2 may not be combined as they cross the break 604, and will instead be issued as partial store commands 208.

Figure 6B:
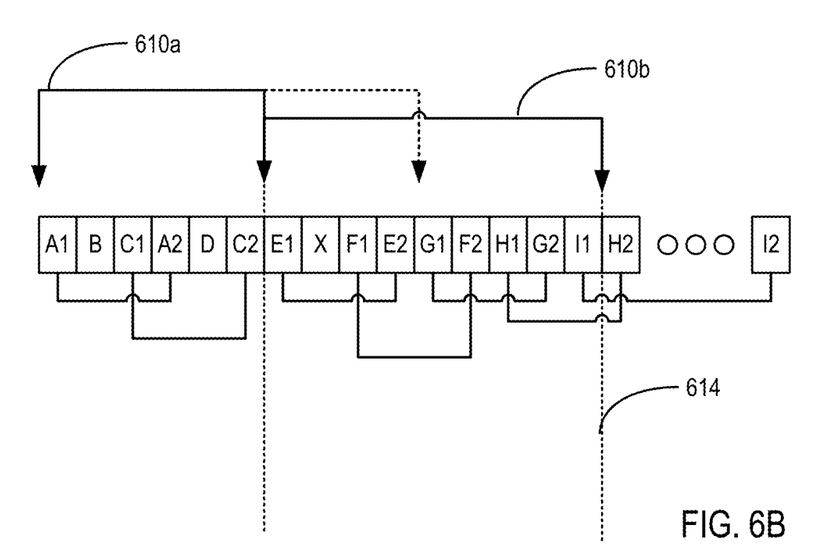
FIG. 6B an example approach for windowed mergers of overlapping combined storage operations according to some embodiments of the present disclosure.

In contrast to FIG. 6A where a new window 602 begins at the end of a previous window 602 of fixed size, FIG. 6B shows the use of a sliding window 610*a*. The PBH 104 identifies an end of any nested chains of partial store commands 208, shown here as being between C2 and E1. A sliding window 610*a* of an initial maximum size is established. The end of the sliding window 610*a* moves to the end of the nested chains as shown. A new sliding window 610*b* begins at the end of the window 610*a*, also of the initial maximum size. Here, where there is no break in the nested chains of partial store commands 208, the end of the new sliding window 610*b* remains between I1 and H2, establishing a break 614. Combining of partial store command 208 pairs across the break 614 (e.g., pairs H1,H2 and I1,I2) is prevented as described above.

For either approach set forth in FIGS. 6A and 6B, for a given window 602, 610*a,b*, coherency protection is requested for all cache lines to be written to. After coherency protection has been granted, the storage operations (e.g., combined partial store commands 302 and partial store commands 208) are performed. On successful commitment of the storage operations, coherency protection is released and processing of the next window begins. In response to an error occurring in a window 602, 610*a,b*, all storage operations in the window or only the combined partial store commands 302 with overlapping dependencies in the window are canceled. Any canceled combined partial store commands 302 are then split into their component partial store commands 208 and then executed as normal.

Although the approaches set forth herein are described with respect to receiving Ethernet frames 202 via a network adapter 102, one skilled in the art will appreciate the approaches set forth herein are applicable to any PCIe device accepting input data for storage to cache lines of suitable size.

Combining PCIe partial store commands along cache line boundaries in accordance with the present application is generally implemented with computers, that is, with automated computing machinery. For further explanation, therefore, FIG. 7 sets forth a block diagram of computing machinery including an exemplary computer 700 configured for combining PCIe partial store commands along cache line boundaries according to certain embodiments. The computer 700 of FIG. 7 includes at least one computer processor 702 or 'CPU' as well as random access memory 704 (RAM') which is connected through a high speed memory bus 706 and bus adapter 708 to processor 702 and to other components of the computer 700.

Stored in RAM 704 is an operating system 710. Operating systems useful in computers configured for combining PCIe partial store commands along cache line boundaries according to certain embodiments include UNIX™, Linux™, Microsoft Windows™, zOS™, and others as will occur to those of skill in the art. The operating system 710 in the example of FIG. 7 is shown in RAM 704, but many components of such software typically are stored in non-volatile memory also, such as, for example, on data storage 712, such as a disk drive.

Figure 7:
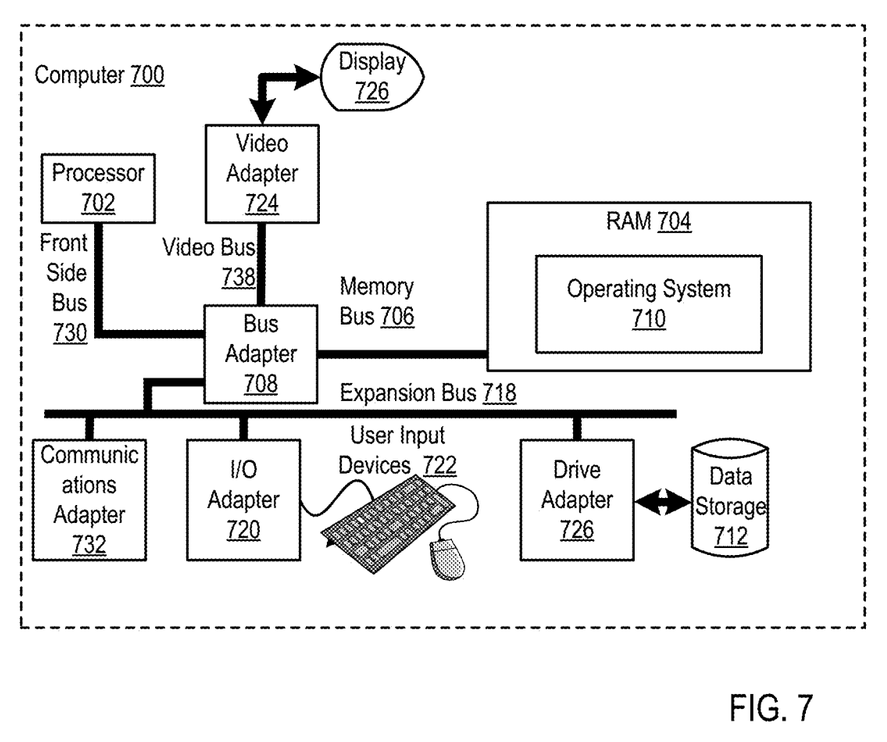
FIG. 7 shows a block diagram of an example computer for combining PCIe partial store commands along cache line boundaries according to some embodiments of the present disclosure.

The computer 700 of FIG. 7 includes disk drive adapter 716 coupled through expansion bus 718 and bus adapter 708 to processor 702 and other components of the computer 700. Disk drive adapter 716 connects non-volatile data storage to the computer 700 in the form of data storage 712. Disk drive adapters useful in computers configured for combining PCIe partial store commands along cache line boundaries according to certain embodiments include Integrated Drive Electronics ('IDE') adapters, Small Computer System Interface ('SCSI') adapters, Storage Area Networks (SANs) including SANs implementing protocols such as Fiber Connect (FI-CON), and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 700 of FIG. 7 includes one or more input/output ('I/O') adapters 720. I/O adapters implement user-oriented input/output through, for example, software drivers and computer hardware for controlling output to display devices such as computer display screens, as well as user input from user input devices 722 such as keyboards and mice. The example computer 700 of FIG. 7 includes a video adapter 724, which is an example of an I/O adapter specially designed for graphic output to a display device 726 such as a display screen or computer monitor. Video adapter 724 is connected to processor 702 through a high speed video bus 728, bus adapter 708, and the front side bus 730, which is also a high speed bus.

The exemplary computer 700 of FIG. 7 includes a communications adapter 732 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for combining PCIe partial store commands along cache line boundaries according to certain embodiments include modems for wired dial-up communications, Ethernet (IEEE 802.3) adapters for wired data communications, and 802.11 adapters for wireless data communications.

Figure 8:
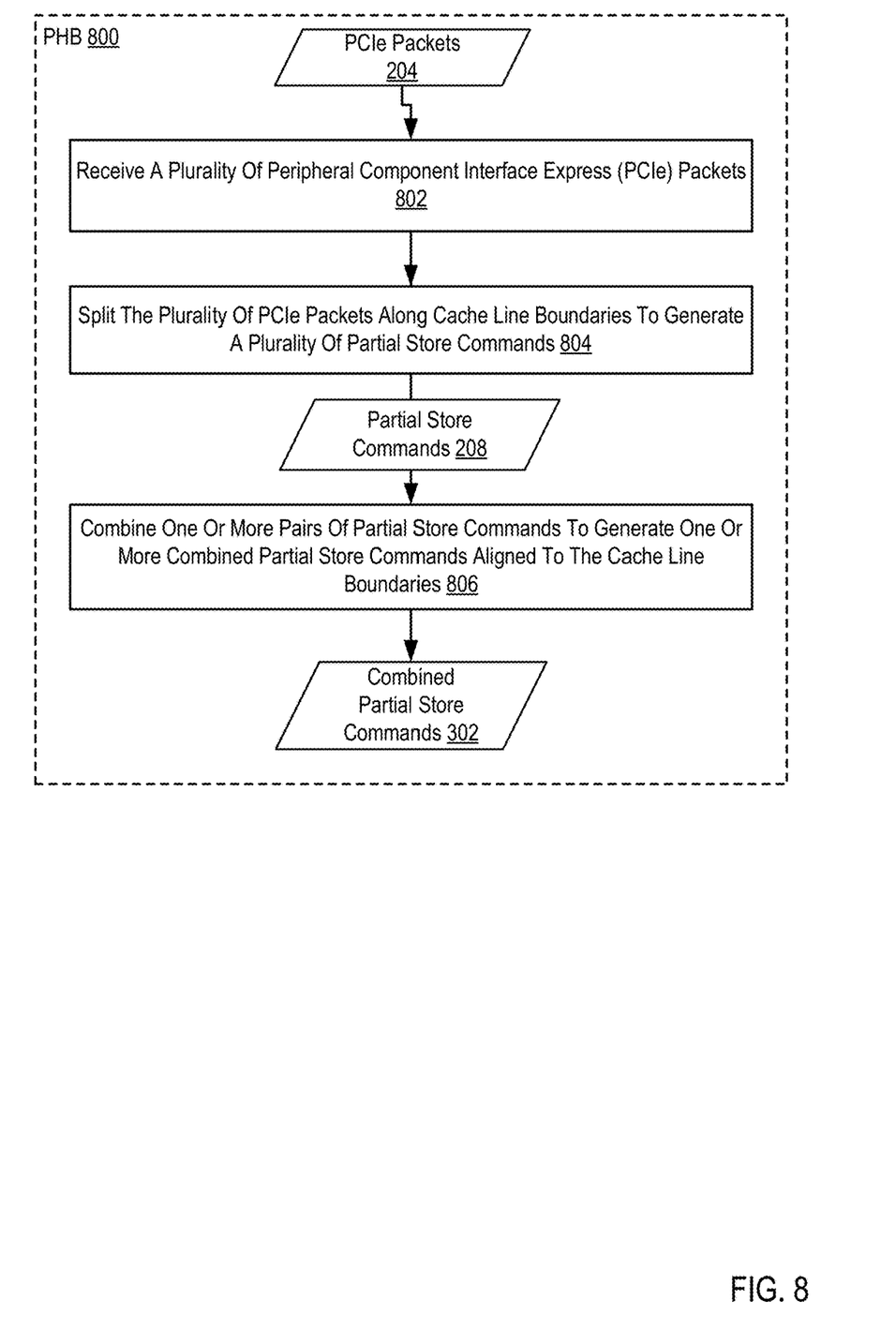
FIG. 8 shows a flowchart of an example method for combining PCIe partial store commands along cache line boundaries according to some embodiments of the present disclosure.

For further explanation, FIG. 8 shows a flowchart of an example method for combining PCIe partial store commands along cache line boundaries according to some embodiments of the present disclosure. The method of FIG. 8 may be performed, for example, in a PHB 800 such as the PHB 104 described above. The method of FIG. 8 includes receiving 802 (e.g., from a network adapter 102 or another PCIe device) a plurality of PCIe packets 204. The PCIe packets 204 may include, for example, a portion of a data payload of some data input to the source of the PCIe packets 204. For example, the PCIe packets 204 may be generated from an Ethernet frame 202 received by a network adapter 102. In some embodiments, the PCIe packets 204 may be received as an interleaved stream of PCIe packets 204 generated from different sources (e.g., from different Ethernet frames 202, from different streams of Ethernet frames 202, and the like).

The method of FIG. 8 also includes splitting 804 the plurality of PCIe packets 204 along cache line boundaries 206 to generate a plurality of partial store commands 208. A partial store command 208 is a storage operation, such as a DMA storage operation, that stores a subset of data in a PCIe packet 204 payload. The partial store commands 208 are aligned along cache line boundaries 206 in that data within a given partial store command 208 will not be written to different cache lines.

The method of FIG. 8 also includes combining 806 one or more pairs of partial store commands 208 to generate one or more combined partial store commands 302 aligned to the cache line boundaries 206. The combined partial store commands 302 are aligned along cache line boundaries 206 in that data within a given combined partial store commands 302 will not be written to different cache lines. A combined partial store operation 302 is a single storage operation that stores the data payloads of two or more partial store commands 208. As shown, each combined partial store operation 302 stores the data from a partial store operation 208 of Y bytes and a partial store operation 208 of X bytes, resulting in a total storage size of 256 bytes assuming 256 byte cache lines. The partial store commands 208 used to generate a given combined partial store operation 302 are those partial store commands 208 that would otherwise be written to a same cache line. Accordingly, as the partial store commands 208 that would otherwise be written to a same cache line would include data from different PCIe packets 204, the combined partial store commands 302 will cause data to be stored from these different PCIe packets 204.

Figure 9:
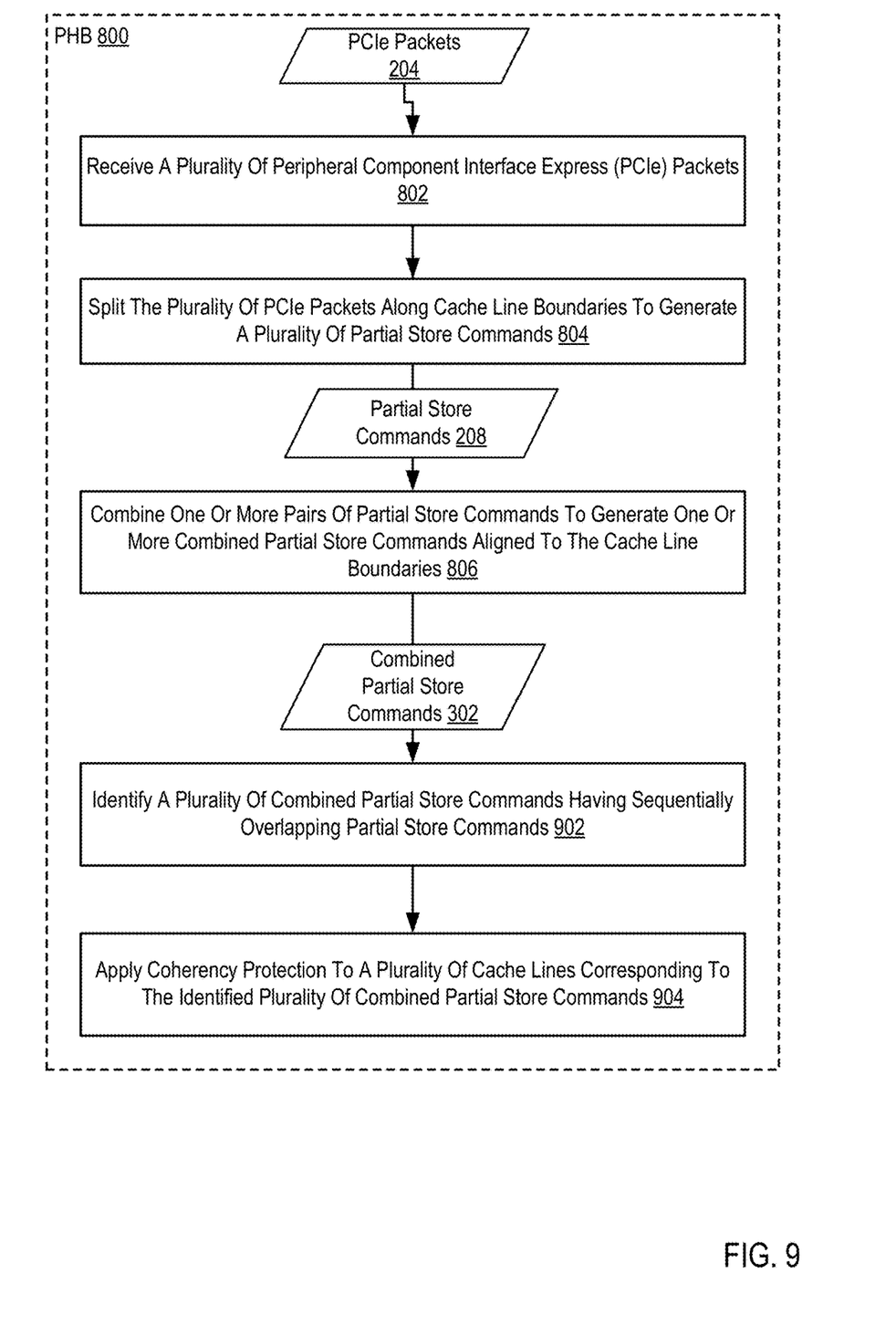
FIG. 9 shows a flowchart of an example method for combining PCIe partial store commands along cache line boundaries according to some embodiments of the present disclosure.

For further explanation, FIG. 9 sets forth a flowchart of another example method for combining PCIe partial store commands along cache line boundaries according to some embodiments of the present disclosure. The method of FIG. 9 is similar to FIG. 8 in that the method of FIG. 9 includes receiving 802 a plurality of PCIe packets 204; splitting 804 the plurality of PCIe packets 204 along cache line boundaries 206 to generate a plurality of partial store commands 208; and combining 806 one or more pairs of partial store commands 208 to generate one or more combined partial store commands 302 aligned to the cache line boundaries 206.

The method of FIG. 9 differs from FIG. 8 in that the method of FIG. 9 includes identifying 902 a plurality of combined partial store commands 302 having sequentially overlapping partial store commands 208. Combined partial store commands 302 have sequentially overlapping partial store commands 208 wherein a partial store command 208 of one combined partial store command 302 occurs sequentially between the partial store commands 208 of another combined partial store command 302. In some embodiments, identifying 902 the plurality of combined partial store commands 302 may be based on a window 602 of partial store commands 302, a sliding window 610a,b of partial store commends 302, and the like.

The method of FIG. 9 also includes applying 904 coherency protection to a plurality of cache lines corresponding to the identified plurality of combined partial store commands 302. Where coherency protection to a given cache line is applied, a processor 108 is unable to access the given cache line. Thus, a processor 108 may not access any data stored out of order until coherency protection is released. As the data stored out of order is not made available to the processor 108, ordering restrictions under the PCIe standard are not violated.

Figure 10:
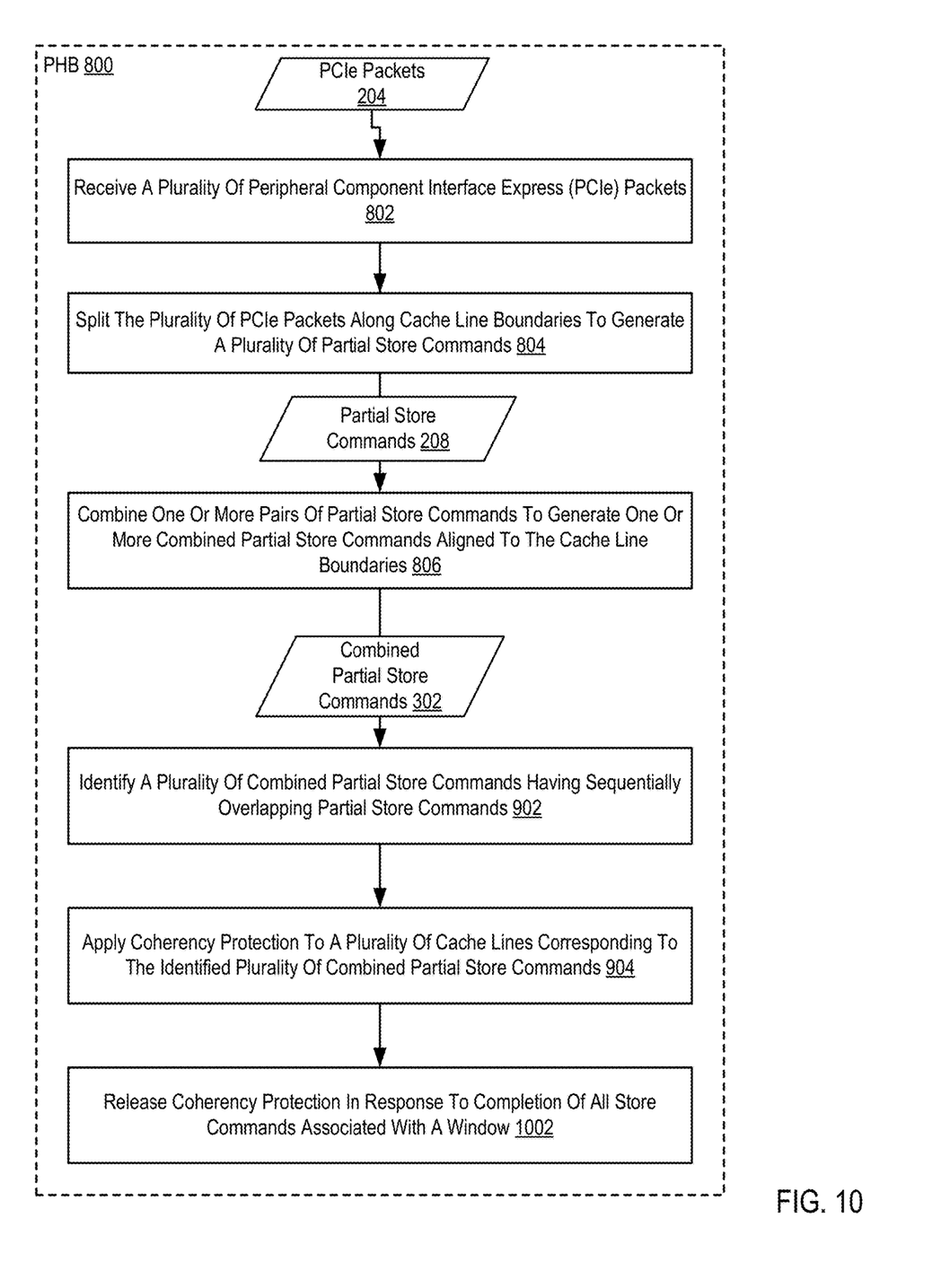
FIG. 10 shows a flowchart of an example method for combining PCIe partial store commands along cache line boundaries according to some embodiments of the present disclosure.

For further explanation, FIG. 10 sets forth a flowchart of another example method for combining PCIe partial store commands along cache line boundaries according to some embodiments of the present disclosure. The method of FIG. 10 is similar to FIG. 9 in that the method of FIG. 10 includes receiving 802 a plurality of PCIe packets 204; splitting 804 the plurality of PCIe packets 204 along cache line boundaries 206 to generate a plurality of partial store commands 208; and combining 806 one or more pairs of partial store commands 208 to generate one or more combined partial store commands 302 aligned to the cache line boundaries 206; identifying 902 a plurality of combined partial store commands 302 having sequentially overlapping partial store commands 208; and applying 904 coherency protection to a plurality of cache lines corresponding to the identified plurality of combined partial store commands 302.

The method of FIG. 10 differs from FIG. 9 in that the method of FIG. 10 also includes releasing 1002 coherency protection in response to completion of all store commands (e.g., partial store commands 208 and combined partial store commands 302) associated with a window (e.g. a window 602, a sliding window 610*a,b*). As all store commands are completed, coherency protection may be released such that a processor 108 may access the stored data without the risk of violating coherency or ordering of storing data.

Figure 11:
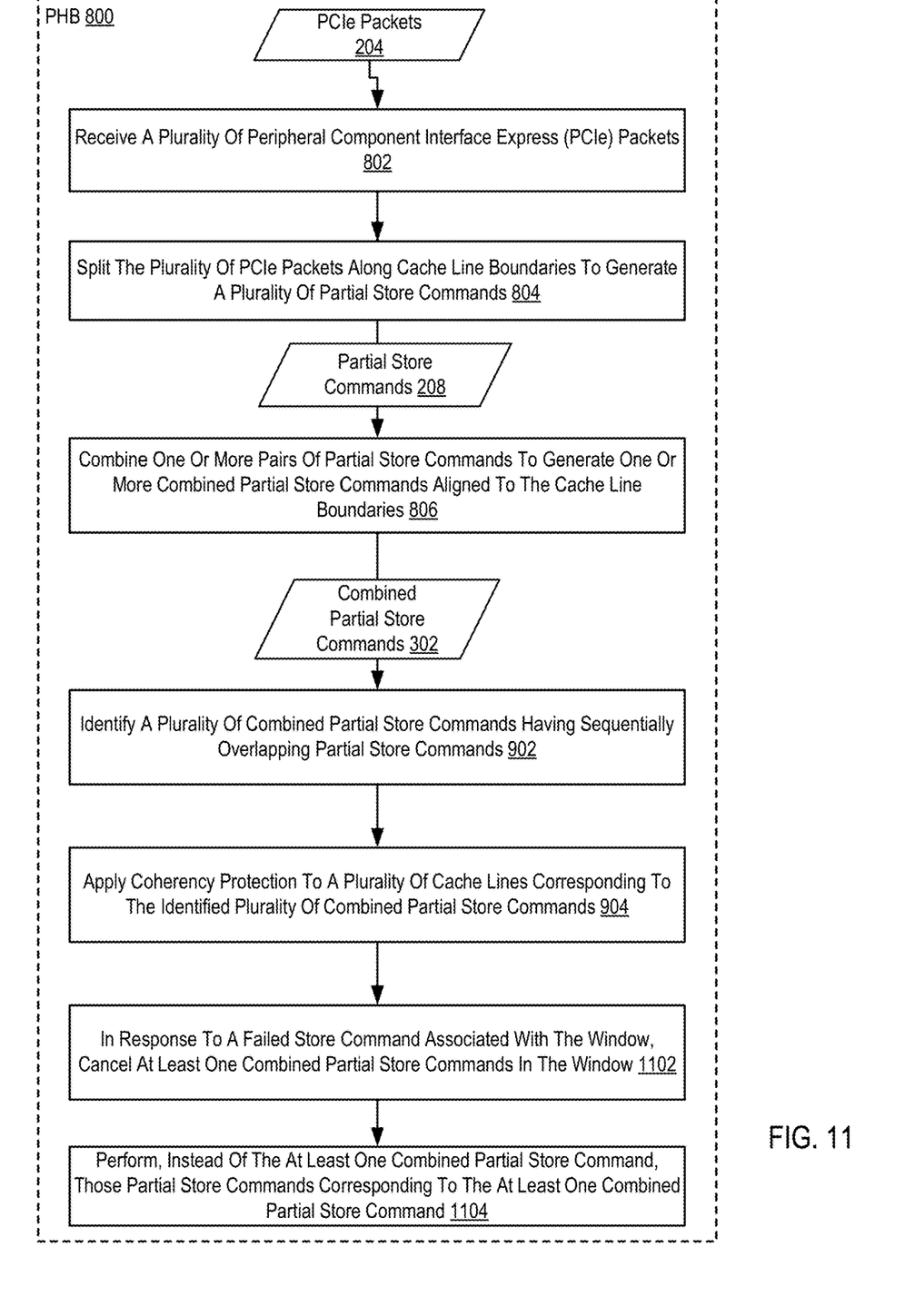
FIG. 11 shows a flowchart of an example method for combining PCIe partial store commands along cache line boundaries according to some embodiments of the present disclosure.

For further explanation, FIG. 11 sets forth a flowchart of another example method for combining PCIe partial store commands along cache line boundaries according to some embodiments of the present disclosure. The method of FIG. 11 is similar to FIG. 9 in that the method of FIG. 11 includes receiving 802 a plurality of PCIe packets 204; splitting 804 the plurality of PCIe packets 204 along cache line boundaries 206 to generate a plurality of partial store commands 208; and combining 806 one or more pairs of partial store commands 208 to generate one or more combined partial store commands 302 aligned to the cache line boundaries 206; identifying 902 a plurality of combined partial store commands 302 having sequentially overlapping partial store commands 208; and applying 904 coherency protection to a plurality of cache lines corresponding to the identified plurality of combined partial store commands 302.

The method of FIG. 11 differs from FIG. 9 in that the method of FIG. 11 also includes, in response to a failed store command associated with the window, canceling 1102 at least one of the combined partial store commands 302 in the window; and performing 1104, instead of the at least one combined partial store command 302, those partial store commands 208 corresponding to the at least one combined partial store command 302. In some embodiments, in response to the error, all combined storage operations 302 in the window may be canceled. In some embodiments, only those combined storage operations 302 with overlapping partial store commands 208 may be canceled. Instead of the canceled combined storage operations 302, the component partial store commands 208 are performed. In some embodiments, a sequentially last or tailing partial store command 208 may not be performed depending on the particular error handling functions being implemented.

In view of the explanations set forth above, readers will recognize that the benefits of combining PCIe partial store commands along cache line boundaries according to embodiments of the present invention include improved performance of a computing system by eliminating storage operations caused by PCIe devices from overlapping cache line boundaries.

Exemplary embodiments of the present invention are described largely in the context of a fully functional computer system for combining PCIe partial store commands along cache line boundaries. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of combining Peripheral Component Interface (PCIe) partial store commands along cache line boundaries, the method comprising:
    receiving a plurality of PCIe packets;
    splitting the plurality of PCIe packets along cache line boundaries to generate a plurality of partial store commands; and
    combining one or more sets of partial store commands to generate one or more combined partial store commands aligned to the cache line boundaries.

2. The method of claim 1, wherein each partial store command in a combined set of partial store commands corresponds to a different PCI packet.

3. The method of claim 1, wherein the plurality of PCIe packets comprises a plurality of interleaved streams of PCIe packets.

4. The method of claim 3, wherein each interleaved stream of PCIe packets of the plurality of interleaved streams of PCIe packets are generated based on a different network packet.

5. The method of claim 1, further comprising:
    identifying a plurality of combined partial store commands having sequentially overlapping partial store commands; and
    applying coherency protection to a plurality of cache lines corresponding to the identified plurality of combined partial store commands.

6. The method of claim 5, wherein combining the one or more sets of partial store commands is based on a window of partial store commands.

7. The method of claim 6, wherein the window comprises a fixed-size window.

8. The method of claim 6, wherein the window comprises a sliding window.

9. The method of claim 6, further comprising releasing coherency protection in response to completion of all store commands associated with the window.

10. The method of claim 6, further comprising:
    in response to failed store command associated with the window, canceling at least one of the one or more combined partial store commands in the window; and
    performing, instead of the at least one combined partial store command, those partial store commands corresponding to the at least one combined partial store command.

11. A Peripheral Component Interface express (PCIe) host bridge (PHB) configured to perform steps comprising:
    receiving a plurality of PCIe packets;
    splitting the plurality of PCIe packets along cache line boundaries to generate a plurality of partial store commands; and
    combining one or more sets of partial store commands to generate one or more combined partial store commands aligned to the cache line boundaries.

12. The PHB of claim 11, wherein each partial store command in a combined set of partial store commands corresponds to a different PCI packet.

13. The PHB of claim 11, wherein the plurality of PCIe packets comprises a plurality of interleaved streams of PCIe packets.

14. The PHB of claim 13, wherein each interleaved stream of PCIe packets of the plurality of interleaved streams of PCIe packets are generated based on a different network packet.

15. The PHB of claim 11, wherein the steps further comprise:
  identifying a plurality of combined partial store commands having sequentially overlapping partial store commands; and
  applying coherency protection to a plurality of cache lines corresponding to the identified plurality of combined partial store commands.

16. The PHB of claim 15, wherein combining the one or more sets of partial store commands is based on a window of partial store commands.

17. The PHB of claim 16, wherein the window comprises a fixed-size window.

18. The PHB of claim 16, wherein the window comprises a sliding window.

19. The PHB of claim 16, further comprising releasing coherency protection in response to completion of all store commands associated with the window.

20. The PHB of claim 16, further comprising:
  in response to failed store command associated with the window, canceling at least one of the one or more combined partial store commands in the window; and
  performing, instead of the at least one combined partial store command, those partial store commands corresponding to the at least one combined partial store command.

* * * * *